(12) United States Patent
Roberts

(10) Patent No.: US 8,909,069 B2
(45) Date of Patent: *Dec. 9, 2014

(54) SIGNAL FRAMING IN A COHERENT OPTICAL RECEIVER

(71) Applicant: Kim B. Roberts, Ottawa (CA)

(72) Inventor: Kim B. Roberts, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,874

(22) Filed: May 21, 2013

(65) Prior Publication Data

US 2013/0259493 A1    Oct. 3, 2013

Related U.S. Application Data

(63) Continuation of application No. 11/552,016, filed on Oct. 23, 2006, now Pat. No. 8,463,133.

(51) Int. Cl.
| | | |
|---|---|---|
| *H04L 7/00* | (2006.01) | |
| *H04B 1/38* | (2006.01) | |
| *H04J 3/06* | (2006.01) | |
| *H04B 10/61* | (2013.01) | |
| *H04B 10/60* | (2013.01) | |

(52) U.S. Cl.
CPC .......... *H04L 7/0075* (2013.01); *H04B 10/6165* (2013.01); *H04B 10/60* (2013.01); *H04B 10/61* (2013.01); *H04B 10/6162* (2013.01)
USPC ........... 398/208; 398/202; 398/159; 375/226; 375/350; 375/368

(58) Field of Classification Search
CPC .......... H04J 14/02; H04J 13/12; H04B 10/61; H04B 10/6161
USPC ................................................ 398/202, 208
See application file for complete search history.

(56) References Cited

U.S. PATENT DOCUMENTS

| | | |
|---|---|---|
| 4,506,388 A | 3/1985 | Monerie et al. |
| 4,720,827 A | 1/1988 | Kanaji |

(Continued)

FOREIGN PATENT DOCUMENTS

| | | |
|---|---|---|
| EP | 1453239 A1 | 9/2004 |
| GB | 2214381 A | 8/1989 |

(Continued)

OTHER PUBLICATIONS

Richard A. Linke, et al., "High-Capacity Coherent Lightwave Systems", Journal of Lightwave Technology, vol. 6, No. 11, Nov. 1988, pp. 1750-1769.

(Continued)

*Primary Examiner* — Oommen Jacob
(74) *Attorney, Agent, or Firm* — Kent Daniels; Daniels IP Services Ltd

(57) ABSTRACT

A method and system for a estimating a most likely location of a periodic SYNC burst within an optical signal received through an optical communications system. A cross-correlation is calculated between a multi-bit digital signal derived from the optical signal and a known symbol sequence of the SYNC burst. The cross-correlation is processed in at least one sub-block to identify a candidate sub-block in which the SYNC burst is most likely located. The candidate sub-block is then further analyzed to estimate a location of the SYCN burst.

21 Claims, 7 Drawing Sheets

(56) References Cited

U.S. PATENT DOCUMENTS

| | | | |
|---|---|---|---|
| 4,723,316 A | 2/1988 | Glance | |
| 4,965,858 A | 10/1990 | Naito et al. | |
| 5,187,719 A * | 2/1993 | Birgenheier et al. | 375/226 |
| 5,363,412 A | 11/1994 | Love et al. | |
| 5,457,563 A | 10/1995 | Van Deventer | |
| 5,473,463 A | 12/1995 | Van Deventer | |
| 5,596,582 A * | 1/1997 | Sato et al. | 370/509 |
| 5,995,512 A | 11/1999 | Pogue et al. | |
| 6,473,222 B2 | 10/2002 | Hait et al. | |
| 6,603,777 B1 | 8/2003 | Kubota | |
| 6,607,311 B1 | 8/2003 | Fishman et al. | |
| 6,782,211 B1 | 8/2004 | Core | |
| 7,184,505 B2 * | 2/2007 | Watanabe | 375/368 |
| 8,463,133 B1 * | 6/2013 | Roberts | 398/154 |
| 2002/0012152 A1 | 1/2002 | Agazzi et al. | |
| 2002/0186435 A1 | 12/2002 | Shpantzer et al. | |
| 2003/0053389 A1 * | 3/2003 | Mashimo | 369/59.11 |
| 2003/0063285 A1 | 4/2003 | Pering et al. | |
| 2003/0123884 A1 | 7/2003 | Willner et al. | |
| 2003/0175034 A1 | 9/2003 | Noe | |
| 2004/0114939 A1 * | 6/2004 | Taylor | 398/152 |
| 2005/0069064 A1 | 3/2005 | Propp et al. | |
| 2005/0135489 A1 | 6/2005 | Ho et al. | |
| 2005/0196176 A1 | 9/2005 | Sun et al. | |
| 2007/0072646 A1 * | 3/2007 | Kuwahara et al. | 455/561 |

FOREIGN PATENT DOCUMENTS

| | | |
|---|---|---|
| WO | WO 00/60776 A1 | 10/2000 |
| WO | WO 02/27994 A1 | 4/2002 |

OTHER PUBLICATIONS

Chul-Ho Shin, et al., "Heterodyne Optical Phase-Locked Loop by Confocal Fabry-Perot Cavity Coupled AlGaAs Laser", IEEE Photonoics Technology Letters, vol. 2, No. 4, Apr. 1990, pp. 297-300.

D.-S. Ly-Gagnon, et al., "Coherent Detection of Optical Quadrature Phase-Shift Keying Signals with Carrier Phase Estimation", Journal of Lightwave Technology, vol. 24, No. 1, Jan. 2006, pp. 12-21.

Frowin Derr, "Coherent Optical QPSK Intradyne System: Concept and Digital Receiver Realization", Journal of Lightwave Technology, vol. 10, No. 9, Sep. 1992, pp. 1290-1296.

D.-S. Ly-Gagnon, et al., "Unrepeatered optical transmission of 20 Gbil/s quadrature phase-shift keying signals over 210 km using homodyne phase-diversity receiver and digital signal processing", Electronics Letters, vol. 41, No. 4, Feb. 17, 2005, pp. 1-2.

Y. Cai, et al., "On Performance of Coherent Phase-Shift-Keying Modulation in 40 Gb/s Long-Haul Optical Fiber Transmission Systems", OFC, Mar. 2006, pp. 1-3.

Matihias Seimetz, "Performance of Coherent Optical Square-16-QAM-Systems based on IQ-Transmitters and Homodyne Receivers with Digital Phase Estimation", OFC, Mar. 2006, pp. 1-10.

U. Koc, et al., Digital Coherent Quadalure Phase-Shift-Keying (QPSK), OFC, Mar. 2006, pp. 1-3.

Satoshi Tsukamoto, et al., "Coherent Demodulation of Optical 8-Phase Shift-Keying Signals Using Homodyne Detection and Digital Signal Processing", OFC, Mar. 2006, pp. 1-3.

Kazuro Kikuchi, "Coherent Detection of Phase-Shift Keying Signals Using Digital Carrier-Phase Estimation", OFC, Mar. 2006, pp. 1-3.

B. Spinnler et al., "Chromatic Dispersion Tolerance of Coherent Optical Communications Systems With Electrical Equalization", OFC, Mar. 2006, pp. 1-3.

R.I. Killey, et al., "Electronic dispersion compensation by signal predistortion", OFC, Mar. 2006, pp. 1-3.

Satoshi Tsukamoto, et al., "Unrepeated 20-Gbil/s QPSK Tansmission over 200-km Standard Single-Mode Fiber Using Homodyne Detection and Digital Signal Processing for Dispersion Compensation", OFC, Mar. 2006, pp. 1-3.

S. Calabro, et al., "An electrical polarization-state controller and demultiplexer for polarization multiplexed optical signals", ECOC-IOOC, Sep. 2003, pp. 1-2.

Reinhold Noe, "Phase Noise-Tolerant Synchronous QPSKIBSK Baseband-Type Intradyne Receiver Concept With Feedforward Carrier Recovery", Journal of Lightwave Technology, vol. 23, No. 2, Feb. 2005, pp. 802-808.

Reinhold Noe. "PLL-Free Synchronous QPSK Polarization Multiplex/Diversity Receiver Concept With Digitaii&Q Baseband Processing", IEEE Photonics Technology Letters, vol. 17, No. 4, Apr. 2005, pp. 887-889.

Ezra IP, et al., "Carrier Synchronization for 3-and 4-bit-per-Symbol Optical Transmission", Journal of Lightwave Technology, vol. 23, No. 12, Dec. 2005, pp. 4110-4124.

Yan Han, et al., "Coherent optical communication using polarization multiple-input-multiple-output", Optics Express, vol. 13, No. 19, Sep. 19, 2005, pp. 7527-7534.

L.E. Franks, "Carrier and Bit Synchronization in Data Communication—A Tutorial Review", IEEE Transactions on Communications, vol. COM-28, No. 8, Aug. 1980, pp. 1107-1121.

M. Cavallari, et al., "Electronic Signal Processing for Differential Phase Modulation Formats", OFC 2004, pp. 1-3.

A. Farbert, et al., "Performance of a 10.7 Gb/s Receiver with Digital Equaliser using Maximum Likelihood Sequence Estimation", ECOC 2004, Proceedings PD-Th4.1.5, Stockholm, pp. 1-2.

Yusuke Ota, et al., "High-Speed, Burst-Mode, Packet-Capable Optical Receiver and Instantaneous Clock Recovery for Optical Bus Opearation", Journal of Lightwave Technology, vol. 12, No. 2, Feb. 1994, pp. 325-331.

Isaac Shpantzer, Ph.D., "A New Generation of Coherent ULH Fiber-Optic Communication", Celight Inc., 40 G Workshop, OECC-2002 Conference, Yokohama, Japan, Jul. 8, 2002, pp. 1-14.

Isaac Shpantzer, Ph.D. et al., "Coherent Optical Fiber Communication Architecture, Modeling and Optimization", Celight Inc., SCEE 2002 Conference, Eindhoven, The Netherlands, Jun. 25, 2002, pp. 1-39.

M. Tseytlin et al., "Digital, endless polarization control for polarization multiplexed fiber-optic communications", Celight Inc., OFC 2003, Mar. 24, 2003, pp. 1-14.

International Search Report for applicant's related International PCT Application PCT/CA2006/001458, Sep. 5, 2006.

International Search Report for applicant's related International PCT Application PCT/CA2006/001459, Sep. 5, 2006.

International Search Report for applicant's related International PCT Application PCT/CA2006/001460, Sep. 5, 2006.

* cited by examiner

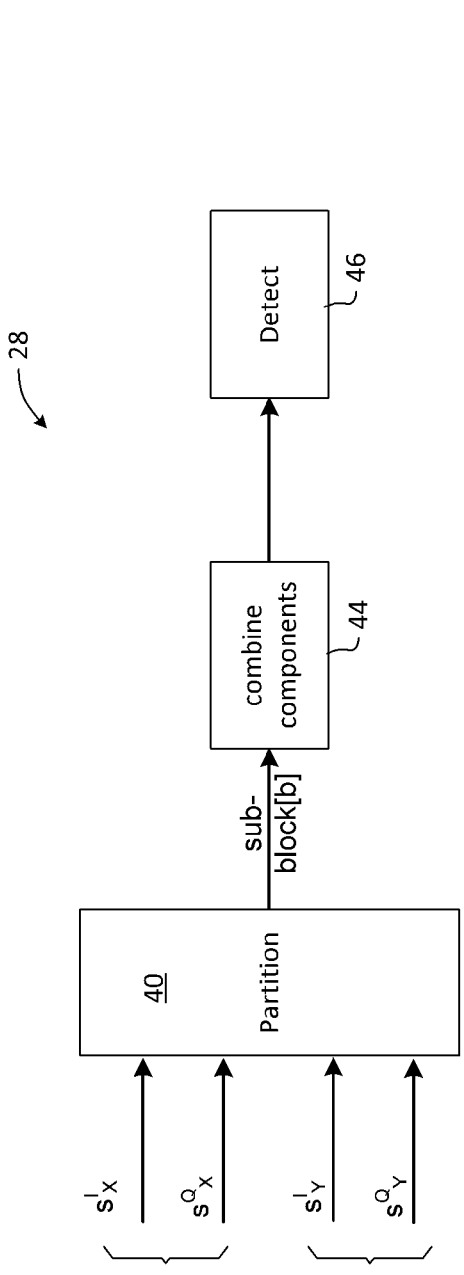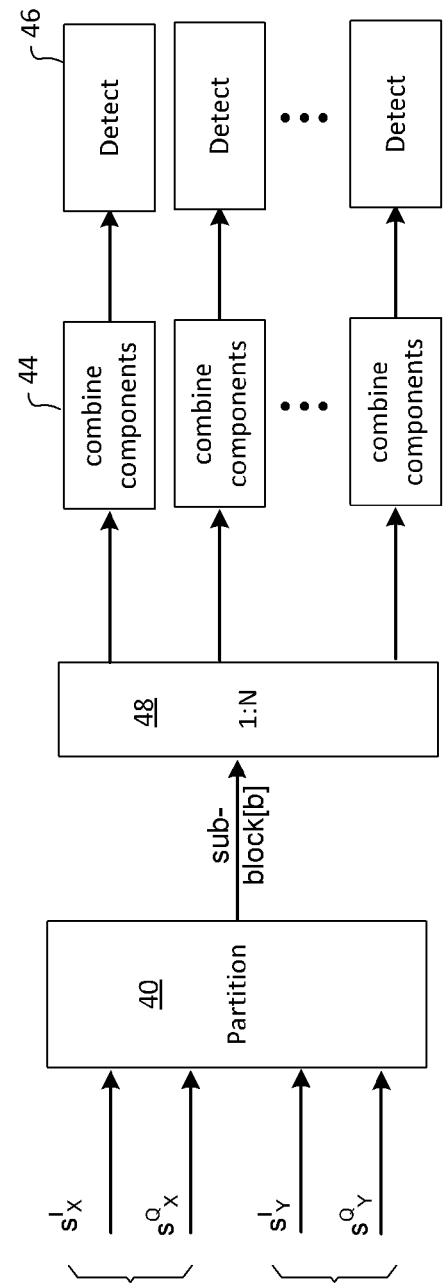
Figure 3a
Figure 3b

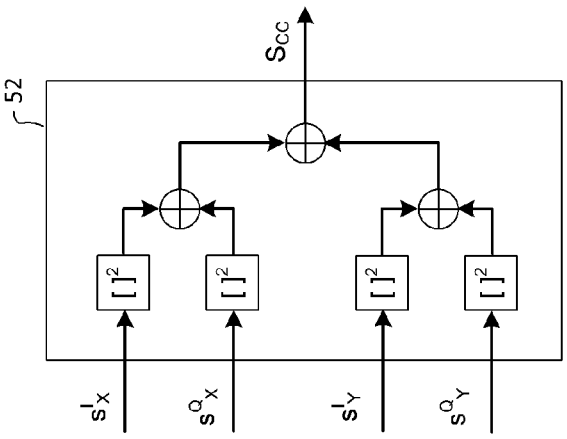
Figure 5
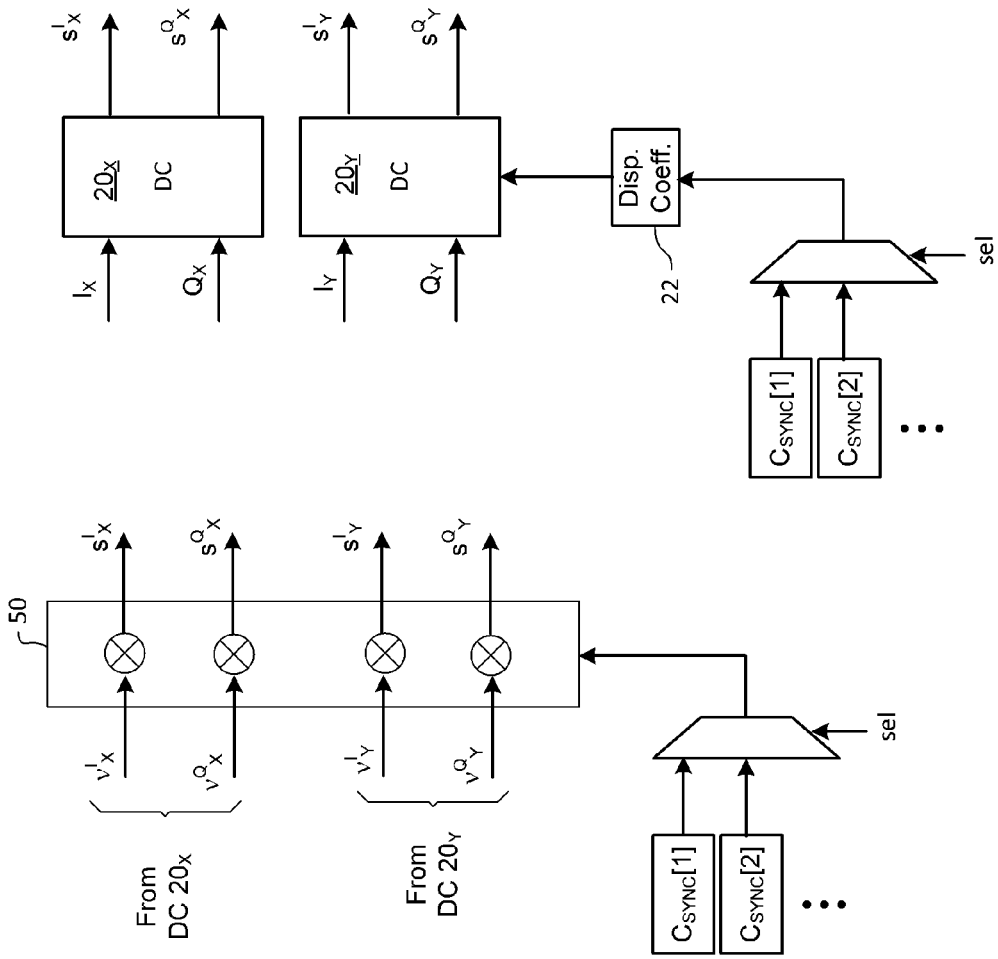
Figure 4b
Figure 4a

SIGNAL FRAMING IN A COHERENT OPTICAL RECEIVER

CROSS-REFERENCE TO RELATED APPLICATIONS

This application is a continuation of U.S. patent application Ser. No. 11/552,016 filed on Oct. 23, 2006 and allowed on Feb. 14, 2013, which claims benefit under 35 U.S.C. 119(e) from U.S. Provisional Patent Application Ser. No. 60/728,751, entitled Automatic Gain Control, which was filed on Oct. 21, 2005.

TECHNICAL FIELD

The present invention relates to optical communications networks, and in particular to signal framing in a coherent optical receiver.

BACKGROUND OF THE INVENTION

Optical signals received through conventional optical links are typically distorted by significant amounts of chromatic dispersion (CD) and polarization dependent impairments such as Polarization Mode Dispersion (PMD), polarization angle changes and polarization dependent loss (PDL). Chromatic dispersion (CD) on the order of 30,000 ps/nm, and polarization rotation transients at rates of $10^5$ Hz are commonly encountered. Various methods and systems intended to address some of these limitations are known in the art.

FIG. 1 schematically illustrates a representative coherent optical receiver capable of implementing the methods of Applicant's co-pending U.S. patent application Ser. No. 11/294,613 filed Dec. 6, 2005 and entitled "Polarization Compensation In A Coherent Optical Receiver"; Ser. No. 11/315,342 filed Dec. 23, 2005 and entitled "Clock Recovery From An Optical Signal With Dispersion Impairments"; Ser. No. 11/315,345 filed Dec. 23, 2005 and entitled "Clock Recovery From An Optical Signal With Polarization Impairments"; Ser. No. 11/366,392 filed Mar. 2, 2006 and entitled "Carrier Recovery In A Coherent Optical Receiver"; and Ser. No. 11/423,822 filed Jun. 13, 2006 and entitled "Signal Acquisition In A Coherent Optical Receiver", the content of all of which are hereby incorporated herein by reference.

As may be seen in FIG. 1, an inbound optical signal is received through an optical link 2, split into orthogonal received polarizations by a Polarization Beam Splitter 4, and then mixed with a Local Oscillator (LO) signal 6 by a conventional 90° optical hybrid 8. The composite optical signals 10 emerging from the optical hybrid 8 are supplied to respective photodetectors 12, which generate corresponding analog electrical signals 14. The photodetector signals 14 are sampled by respective Analog-to-Digital (A/D) converters 16 to yield raw multi-bit digital signals 18 corresponding to In-phase (I) and Quadrature (Q) components of each of the received polarizations.

The resolution of the A/D converters 16 is a balance between performance and cost. It has been found that a resolution of n=5 or 6 bits provides satisfactory performance, at an acceptable cost. The sample rate of the A/D converters 16 is selected to satisfy the Nyquist criterion for the highest anticipated symbol rate of the received optical signal.

From the A/D converter 16 block, the respective n-bit I and Q signals 18 of each received polarization are supplied to a respective dispersion compensator 20, which operates on the raw digital signal(s) 18 to at least partially compensate chromatic dispersion of the received optical signal. Various methods may be used to implement the dispersion compensators 20. For example, a digital Finite Impulse Response (FIR) filter block which applies a predetermined compensation function c☐ to the raw signals 18 may be used for this purpose. In some embodiments, the compensation function c☐ implemented by each dispersion compensator 20 can be implemented using a respective set of compensation coefficients, which can be adaptively computed by a coefficient calculator 22, for example using the methods described in Applicant's co-pending U.S. patent application Ser. No. 11/328,199 filed Jan. 10, 2006.

The dispersion compensated digital signals 24 appearing at the output of the dispersion compensators 20 are then supplied to a 1:M distribution unit 26, which operates to distribute the signals 24 across M parallel data paths, each of which operates at a lower sample rate (by a factor of M).

In the illustrated embodiment, the distribution unit 26 is implemented as a "burst switch" controlled by a framer 28, to generate successive blocks of samples which can then be routed to each data path. One implementation of a burst switch may, for example, include a multi-port Random Access Memory (RAM).

Within each path, a polarization compensator 30 operates to de-convolve the transmitted I and Q signal components of each polarization from the complex signals 24 output from the dispersion compensators 20. If desired, the polarization compensator 30 may operate as described in Applicant's co-pending U.S. patent application Ser. No. 11/294,613 filed Dec. 6, 2005. The output of the polarization compensator 30 is a pair of multi-bit estimates 32 X'(n) and Y'(n) of the symbols encoded on each transmitted polarization. These symbol estimates 32 X'(n), Y'(n) contain both amplitude and phase information of each transmitted symbol, but also include phase error due to the frequency offset between the Tx and LO frequencies, laser line width and phase noise. In some embodiments, the symbol estimates 32 are 10-bit digital values, comprising 5-bits for each of real and imaginary components of each symbol estimate. The symbol estimates 32 X'(n), Y'(n), appearing at the output of the polarization compensator 30 are then supplied to a carrier recovery block 34 for LO frequency control, symbol detection and data recovery, such as described in Applicant's co-pending U.S. patent application Ser. No. 11/366,392 filed Mar. 2, 2006.

Referring to FIG. 2, the optical signal preferably includes nominally regularly spaced SYNC bursts 36 (which may also be referred to as a framing pattern) embedded within a stream of data symbols 38, as described in Applicant's co-pending U.S. patent application Ser. No. 11/328,199 filed Jan. 10, 2006. Each SYNC burst 36 has a respective predetermined symbol (or, equivalently, bit) sequence on each transmitted polarization. The symbol (bit) sequences of each polarization can be transmitted simultaneously, but this is not essential. In the embodiment of FIG. 2a, two orthogonal bit sequences are used in each SYNC burst 36; each bit sequence being assigned to a respective transmitted polarization. FIG. 2b illustrates an alternative arrangement, in which each of the I and Q components of each transmitted polarization is assigned a respective orthogonal bit sequence.

Framing methods are known for high speed binary signals. For example, U.S. Pat. No. 7,046,700 teaches methods for spectrally invisible framing of a high speed binary signal. However, detection of the frame within the signal presupposes that the binary bit stream has been successfully decoded. On the other hand, signal acquisition in equipment such as a high speed coherent optical receiver requires the identification of the frame or SYNC location, before the binary bit stream has been decoded.

Accordingly, methods and techniques that enable reliable detection of a SYNC burst within a received optical signal, in the presence of moderate to severe impairments remain highly desirable.

SUMMARY OF THE INVENTION

An object of the present invention is to provide methods and techniques that enable reliable detection of a SYNC burst within a received optical signal.

Thus, an aspect of the present invention provides a A method of estimating a most likely location of a periodic SYNC burst within an optical signal received through an optical communications system. A cross-correlation is calculated between a multi-bit digital signal derived from the optical signal and a known symbol sequence of the SYNC burst. The cross-correlation is logically partitioned into sub-blocks. A candidate sub-block in which the SYCN burst is mot likely located is identified, and analysed to estimate a location of the SYCN burst.

BRIEF DESCRIPTION OF THE DRAWINGS

Further features and advantages of the present invention will become apparent from the following detailed description, taken in combination with the appended drawings, in which:

FIGS. 3a and 3b schematically illustrate respective alternative framers in accordance with a representative embodiment of the present invention;

FIGS. 4a and 4b schematically illustrate respective alternative cross-correlation computation techniques usable in embodiments of the present invention;

FIG. 5 schematically illustrates the combiner network of FIGS. 3a and 3b in greater detail;

It will be noted that throughout the appended drawings, like features are identified by like reference numerals.

DETAILED DESCRIPTION OF THE PREFERRED EMBODIMENT

Figure 1:
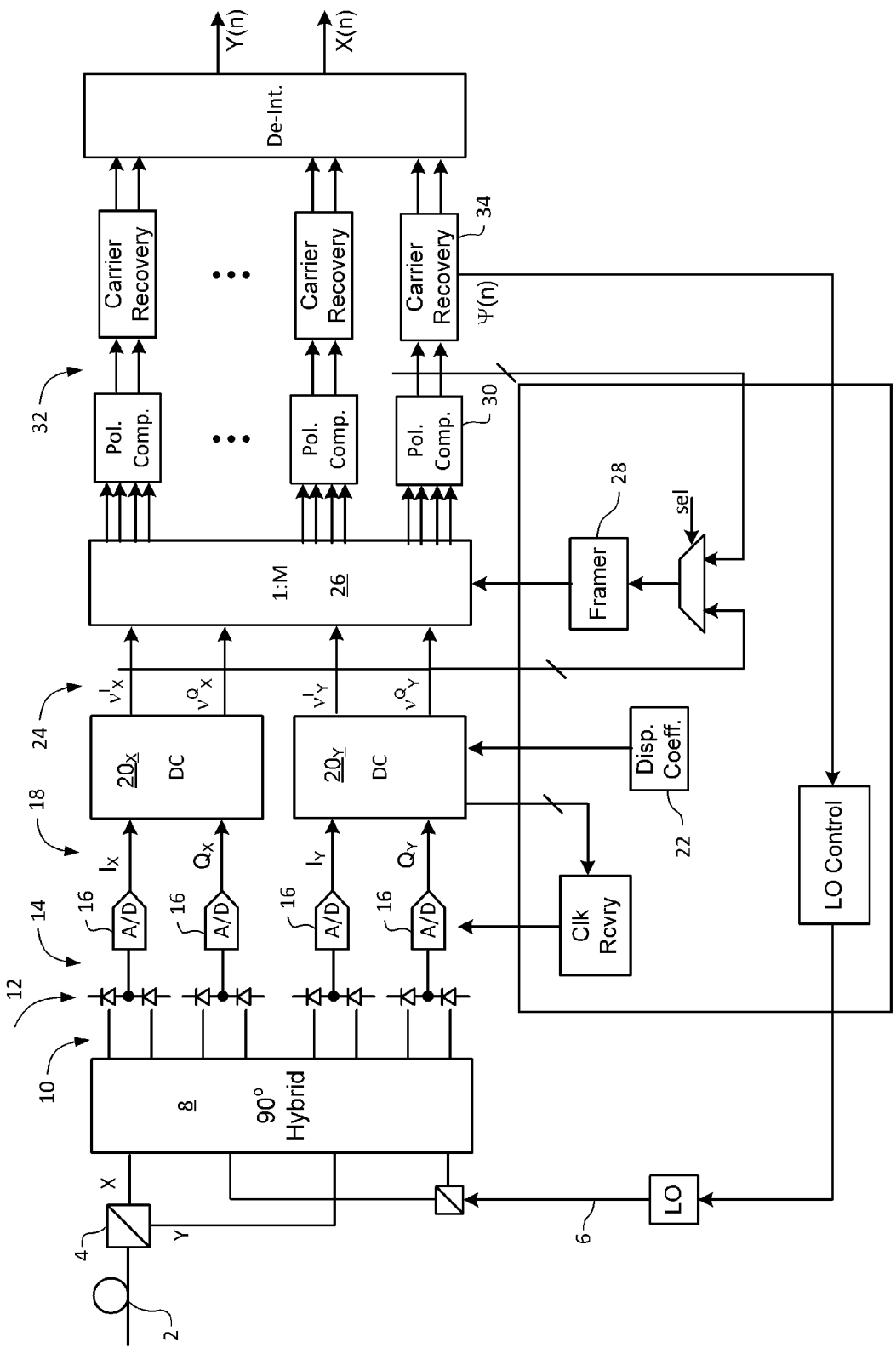
FIG. 1 is a block diagram schematically illustrating principal elements and operations of a coherent optical receiver in which methods in accordance with the present invention may be implemented.
Figure 2A:
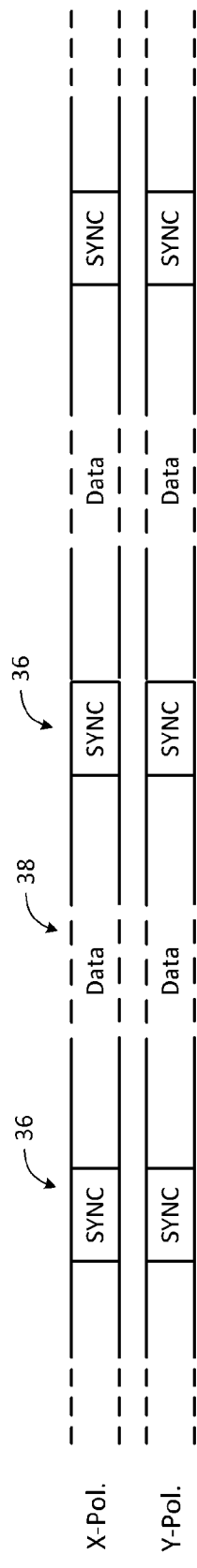
FIGS. 2a and 2b schematically illustrate respective alternative optical signal formats usable in an embodiment of the present invention.
Figure 2B:
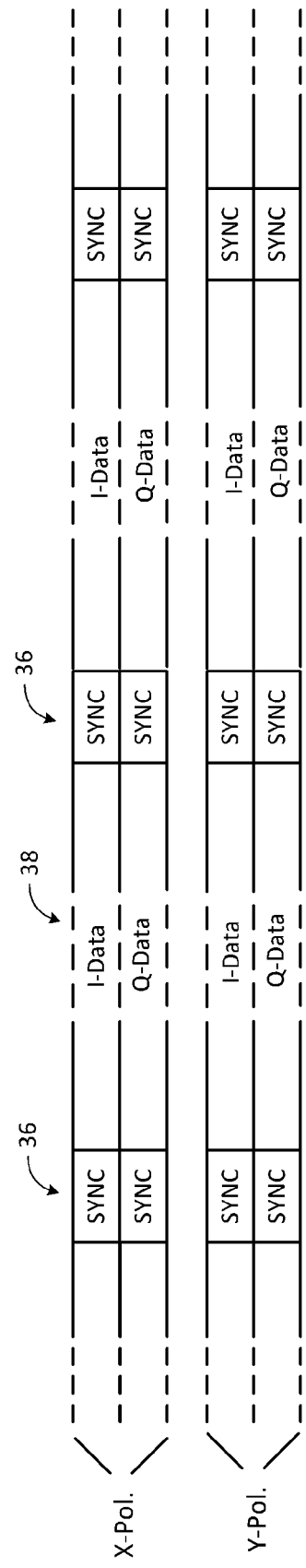

The present invention provides methods and techniques that enable reliable detection of a SYNC burst within an optical signal received by a coherent receiver unit of an optical communications network. Embodiments of the present invention are described below, by way of example only, with reference to FIGS. 1-4.

In general, the present invention provides a method and framer for identifying the most likely location of SYNC bursts within a received optical signal. As may be seen in FIG. 3, the framer 28 may be configured as either a digital signal processor (DSP) or a Field Programmable Gate Array (FPGA), and is connected to receive multi-bit digital signals $s^I_X, s^Q_X, s^I_Y, s^Q_Y$ representing the cross correlation between the dispersion compensated digital signals computed by the dispersion compensators and the known SYNC symbol sequence. These cross-correlation signals $s^I_X, s^Q_X, s^I_Y, s^Q_Y$ are logically partitioned (at 40) into a serial stream of sub-blocks 42 (FIG. 6) having a repetition rate that is synchronous with the digital signal(s). Within each sub-block 42 the signals are combined (at 44), before being passed to a detector 46 to identify the most likely location of the SYNC burst. If desired, a single detection path may be used, as shown in FIG. 3a. Alternatively, a 1:N distributor 48 may be implemented to route sub-blocks to respective ones of a plurality of parallel detection paths, as shown in FIG. 3b so that each sub-block 42 can be processed at a lower clock speed.

In the illustrated embodiment, a respective cross-correlation signal is computed for each component of the multi-bit digital signal. However, this is not essential. If desired, only a sub-set of the signal components (e.g. a single polarization) may be used.

In some embodiments, the cross-correlation signals $s^I_X, s^Q_X, s^I_Y, s^Q_Y$ are computed by a respective logic block 50 using the dispersion compensated digital signals $v^I_X, v^Q_X, v^I_Y, v^Q_Y$ output by the dispersion compensators and a selected one of the SYNC symbol sequences, as shown in FIG. 4a. If desired, the logic block may be incorporated within the framer unit itself. Alternatively, the cross-correlation signals $s^I_X, s^Q_X, s^I_Y, s^Q_Y$ can be computed by the dispersion compensators 20, simultaneously with dispersion compensation, as may be seen in FIG. 4b. In this case, the selected SYNC symbol sequence $C_{SYNC}[x]$ is supplied to the coefficient calculator 22 and incorporated into the dispersion compensation coefficients. For example, consider an embodiment in which each dispersion compensator 20 is implemented as a frequency-domain engine designed to compensate dispersion by processing a fast Fourier Transform (FFT) of the raw sample streams 18 obtained from the Analog-to-Digital A/D converters 16. In this case, the dispersion coefficients can be computed as the sum of a linear dispersive function (to compensate dispersion) and the FFT of the selected SYNC sequence $C_{SYNC}[x]$.

As noted above, in the presence of polarization impairments, the received polarizations will typically not be aligned with the transmitted polarizations. This means that at least some of the energy of each transmitted polarization will typically appear in both of the received polarizations. As a result, any one of the known SYNC burst sequences $C_{SYNC}[x]$, taken alone, may produce usable cross-correlation signals. However, if desired, more than one of the known SYNC burst sequences can be used. For example, in embodiments in which a respective SYNC burst 36 is inserted into each polarization (FIG. 2a), each SYNC burst sequence $C_{SYNC}[x]$ may be applied to a respective pair of digital signals (e.g. $v^I_X, v^Q_X$, and $v^I_Y, v^Q_Y$). In embodiments in which a respective SYNC burst sequence is provided for each of the In-Phase and Quadrature components (FIG. 2b), each SYNC burst sequence $C_{SYNC}[x]$ may be applied to a respective one of the digital signals $v^I_X, v^Q_X, v^I_Y, v^Q_Y$. In a still further alternative, the SYNC burst sequences may be used in a rotational manner, with each SYNC sequence being applied to one or more of the digital signals $v^I_X, v^Q_X, v^I_Y, v^Q_Y$ for a predetermined period of time, for example.

Figure 6:
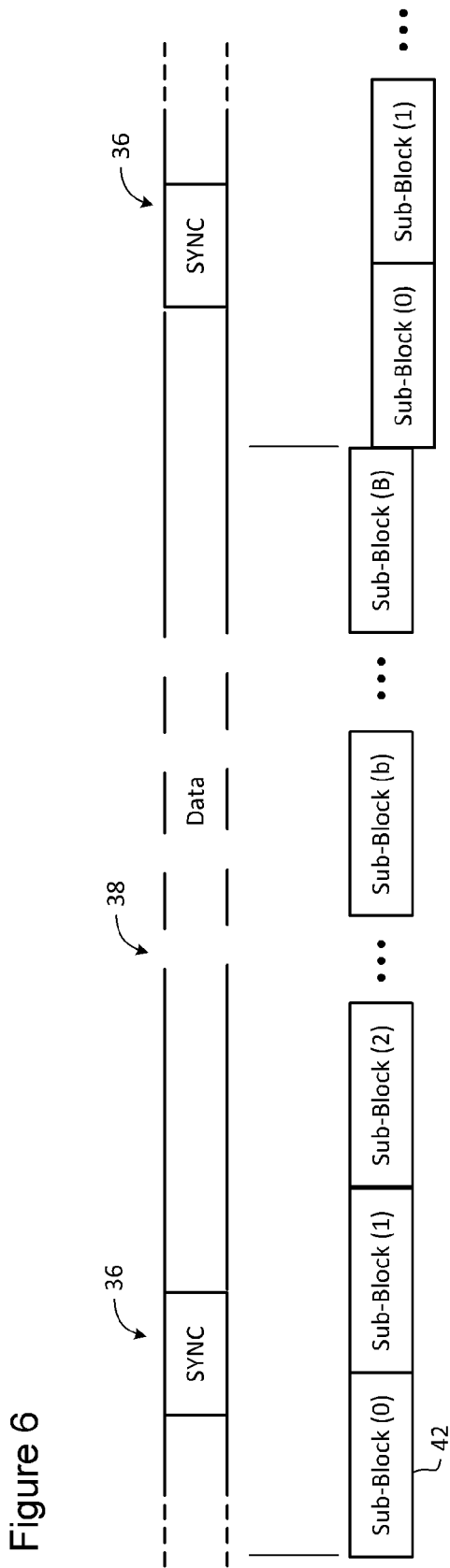
FIG. 6 schematically illustrates a logical partitioning of the cross-correlation signals usable in the embodiments of FIGS. 3a and 3b.

As may be appreciated, any suitable number and size of sub-blocks 42 can be used to logically partition the cross-correlation signals $s^I_X, s^Q_X, s^I_Y, s^Q_Y$. However, it is preferable to match the repetition rate of the sub-blocks 42 to that of the SYNC bursts, as shown in FIG. 6. For example, consider an optical signal in which each SYNC burst is composed of 17 symbols, and there are 751 data symbols between successive SYNC bursts. With Nyquist sampling, the SYNC burst will repeat every (17+751)*2=1536 samples, and it is convenient to define the sub-blocks to span an equal number of samples. In the present example, one possible arrangement is to define 48 sub-blocks of 32 samples each. Of course, other combinations of sub-block number and size may equally be used. An advantage of this arrangement is that there will be at most one SYNC burst 36 within the set of sub-blocks, and at most two (adjacent) sub-blocks which contain samples corresponding to that SYNC burst 36. In addition, the SYNC burst 36 will always be positioned at the same location within the set of sub-blocks, even though that location is (initially) unknown.

Various methods may suitably be used to logically partition the cross-correlation signals $s^I_X, s^Q_X, s^I_Y, s^Q_Y$ into sub-blocks. Since alignment between the sub-blocks and the cross-correlation signals is arbitrary (and initially unknown), a simple method of partitioning is to run a pair of counters (not shown) synchronously with the cross-correlation signals to enable indexing of samples. For example, a sample counter driven synchronously with the cross-correlation signals, and which runs from 0 ... K(=31 for the above-described example signal) can be used to index respective samples within each sub-block 42. A sub-block counter incremented by overflow of the sample counter, and which runs from 0 ... B(=47 for the above-described example signal), can then be used to index each successive sub-block 42. As noted above, partitioning of the cross-correlation signals can also include routing sub-blocks 42 into respective detection paths, as shown in FIG. 3b. In such cases, the 1:N distributor 48 can also be controlled by the sample counter overflow, if desired.

Preferably, the cross-correlation signals within each sub-block are combined using a "sum-of-squares" network 52, as shown in FIG. 5, to yield a cross-correlation vector $S_{CC} = (\{v^I_X\}^2 + \{v^Q_X\}^2) + (\{v^I_Y\}^2 + \{v^Q_Y\}^2)$. This arrangement is advantageous in that it improves the signal-to-noise ratio (SNR) of the SYNC burst 36 within the cross-correlation signal, and reduces the impact of polarization impairments.

As may be appreciated, there are may ways in which the cross-correlation vector $S_{CC}$ may be searched to identify the most likely location of the SYNC burst 36. In the illustrated embodiments, a tail probability represented by a count of sample values $S_{CC}(k)$ of the cross-correlation vector $S_{CC}$ which are greater than a predetermined threshold value is used. This technique is advantageous in that it can be implemented at low cost, and yet is highly tolerant of uncompensated polarization impairments in the dispersion compensated digital signals $v^I_X, v^Q_X, v^I_Y, v^Q_Y$.

Figure 7A:
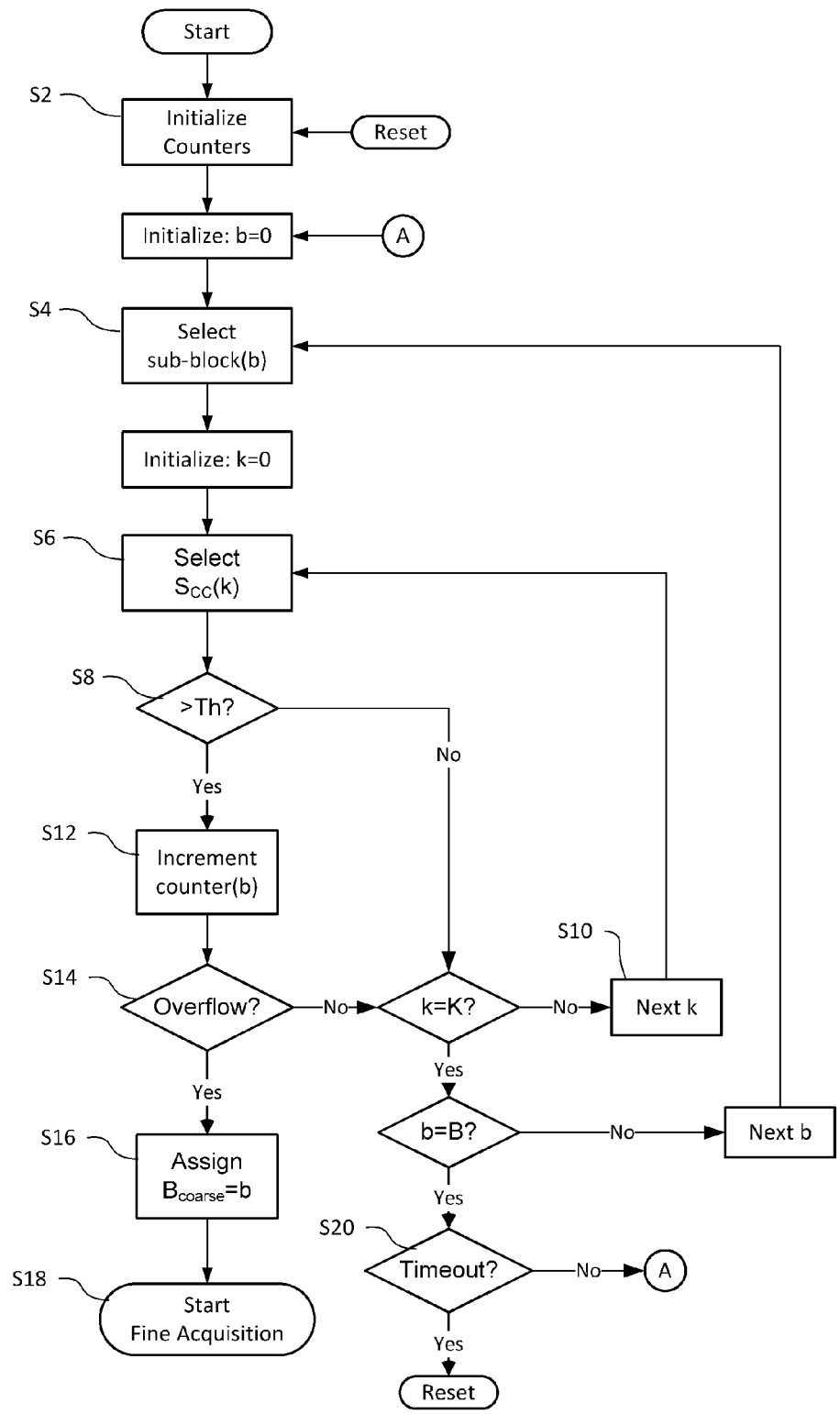
FIGS. 7a and 7b are flow charts illustrating principle steps in a method according to a representative embodiment of the present invention.
Figure 7B:
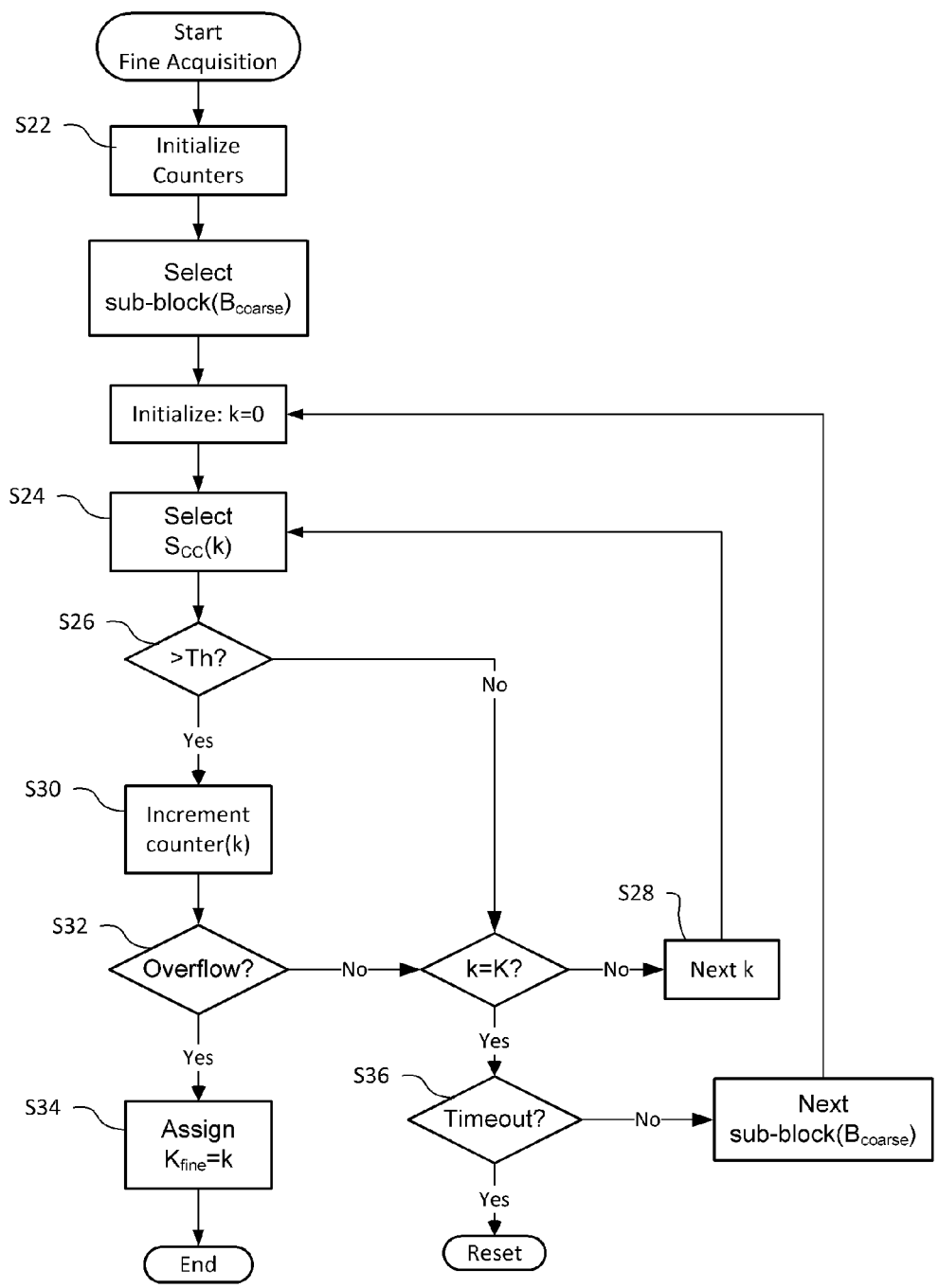

FIGS. 7a and 7b illustrate a representative two-stage search algorithm to identify a most likely location of the SYCN bursts. A first search stage (FIG. 7a) implements a coarse acquisition procedure, in which a sub-block within which the SYNC burst is most likely located is identified. A second stage search (FIG. 7b) can then implement a fine acquisition procedure, in which the identified sub-block is examined in detail to estimate the location of the SYNC burst to a resolution of a single sample. As will be appreciated, these procedures ay be implemented using any suitable combination of hardware and/or software.

Referring now to FIG. 7a, at the start of coarse acquisition, a respective counter C(b), b=0 ... B, for each sub-block is initialized to zero (at S2), and a first sub-block is selected for analysis (step S4). Accordingly, each sample S(k) of the sub-block is selected (step S6), in turn, and compared to the predetermined threshold value (Th) a step S8. If $S_{CC}(k) \leq Th$, the next sample is selected (at S10), and the process continues until all of the samples of the sub-block has been examined.

On the other hand, if $S_{CC}(k) > Th$, the respective counter C(b) is incremented (at S12), and checked to detect an overflow condition (at S14). If the counter has overflowed, then the sub-block is taken as candidate sub-block which likely contains the SYNC burst. Consequently, the index number (b) of the sub-block is assigned to a coarse frame index $B_{coarse}$ (at S16), and the process proceeds to the fine acquisition stage (at S18).

The above procedure is repeated, for each successive sub-block, until either a counter C(b) overflows or a time-out condition occurs (at S20). As is known in the art, the overflow condition is set by the design of the counters, and can be used to balance acquisition speed and accuracy. Increasing the size of the counters delays overflow, which increases accuracy, but at a cost of increasing the time required to obtain a coarse frame lock state. The time-out condition can be used to prevent an end-less loop, resulting from an insufficient numbers of samples $S_{CC}(k)$ being greater than the threshold (Th). Apart indicating that the threshold may be set too high, a time-out condition can be due to a situation in which an equal number of samples corresponding to the SYNC burst are located in two adjacent sub-blocks. In any event, in a time-out condition, the entire process, including logical partitioning of the signal into sub-blocks, is reset, and the acquisition process begins anew.

As may be seen from the forgoing, the first counter C(b) to overflow is used to identify the candidate sub-block (with index $b=B_{coarse}$) which most likely contains the SYNC burst. FIG. 7b is a flow chart illustrating a representative process for locating the SYNC burst within the candidate sub-block.

As may be seen from FIG. 7b, the fine acquisition stage can follow a procedure which is closely similar to that of the coarse acquisition stage. This is advantageous in that it simplifies implementation, and enables re-use of resources (e.g. counters) freed up by completion of the coarse acquisition stage. In this case, however, the framer operates to analyse only the candidate sub-blocks.

Thus, a respective counter C(k), k=0 ... K, for each sample $S_{CC}(k)$ of the candidate sub-block is initialized (at S22) to zero, and a first sample $S_{CC}(k)$ is selected (at S24) and compared to the predetermined threshold value (Th) at S26. If $S_{CC}(k) \leq Th$, the next sample is selected (at S28), and the process continues until all of the samples of the candidate sub-block has been examined. On the other hand, if $S_{CC}(k) > Th$, the respective counter C(k) is incremented (at S30), and checked to detect an overflow condition (at S32). If the counter has overflowed, then the sample $S_{CC}(k)$ is taken as indicating the location of the SYNC burst. Consequently, the index number (k) of that sample is assigned to a fine frame index $K_{fine}$ (at S34), to complete the acquisition process.

The above fine acquisition procedure is repeated, for each successive candidate sub-block (index $b=B_{coarse}$), until either a counter C(k) overflows or a time-out condition occurs (at S36). As described above, the overflow condition is set by the design of the counters, and can be used to balance acquisition speed and accuracy. Increasing the size of the counters delays overflow, which increases accuracy, but at a cost of increasing the time required to obtain a coarse frame state. The time-out condition can be used to prevent an end-less loop, resulting from an insufficient numbers of samples $S_{CC}(k)$ being greater than the threshold. Here again, in a time-out condition, the entire process, including logical partitioning of the signal into sub-blocks, is reset, and the acquisition process begins anew.

In the above-described embodiments, the same threshold value (Th) is used for both coarse and fine acquisition stages. However, this is not necessary. Different threshold values may be used, if desired.

The methods described above with reference to FIGS. 3-7 are sufficiently accurate to facilitate reliable signal acquisition and start-up of the distribution block 26, polarization compensators 30 and carrier recovery blocks 34 of the receiver of FIG. 1, even in the presence of residual (uncompensated) dispersion, moderate to severe polarization impairments, and a significant phase errors due to frequency mismatch between the local oscillator and the received carrier. As may be appreciated, once the distribution block 26, polarization compensators 30 and carrier recovery blocks 34 have stabilized, the framer 28 can apply conventional digital correlation and synchronization techniques to the either multi-bit symbol estimates X'(n) and Y'(n) 32 output of the polarization compensator 30, or the recovered symbols generated by the carrier recovery block 34.

The foregoing description provides a simplified example embodiment, in which the SYNC burst has a fixed (and known) periodicity, and sub-blocks are defined which span one full period of the optical signal. This arrangement is advantageous because it enables an optimized implementation. However, it will be understood that numerous variation may be implemented, if desired.

For example, the SYNC burst repletion period can be initially unknown and need to be determined, or the SYNCH occurances may be periodic with a complicated, random, or unknown pattern. The same methods described above can be extended to cover these cases by considering more alternatives, either in series or in parallel.

For a signal with a SYNC period of N symbols (where N is unknown), there are N possible SYNCH locations to consider. Thus, a first step is to identify a set of M candidate SYNC locations, where the set contains less than all N possible locations. It is advantageous for M to be ⅛ or less of N in order to reduce the amount of high speed memory required. In the methods describe above, the M locations correspond with the sub-blocks, which are contiguous and span a complete period of the optical signal. However, they could equally be an arbitrary set of one or more sub-blocks, and may or may not be contiguous.

Consider those M locations. In a coherent receiver the samples are complex, and when carrier recovery has not yet been performed, the phases of those samples rotate with carrier frequency offset and phase noise. When this is not the case, the synchronous averaging of the samples with period N will improve the signal to noise ratio. This periodic averaging can also be done to the correlation values, for example using the tail probability function described above.

When the phase rotation is present, the periodic addition of the magnitude of correlation values overcomes the phase rotation issue. Reducing the number of locations to M reduces the corresponding amount of high speed memory and averaging operations required.

It is not essential to use a tail probability function. If desired, any of a probability, or threshold crossing, or other metric processed from the correlation can be accumulated, averaged, counted, or confirmed with samples at the same location in subsequent periods.

As noted above, once signal acquisition has been completed, and the coherent optical receiver entered a steady-state processing mode, the decoded SYNC symbols can be used to confirm the SYNC location. Note that these confirmations occur after the candidate SYNC locations have been identified, because in general, knowledge of the correct location is required in order to do the processing to derive the symbols from the multi-bit samples of the analog optical signal.

Other metrics such as a mean squared error, or an error count can be used to confirm a candidate SYNC location.

As may be appreciated, identification of a candidate sub-block can be accomplished using as few as a single sub-block spanning a fraction of a period. This can eventually cover the full period by moving the sub-block (or search window) in a deterministic or random sequence. Windows can be located in sequential periods or from periods that are significantly separated. An advantageous implementation of this is to have a window of 256 samples, the location of which, relative to the SYNC burst period, keeps incrementing by 64 or 128 symbols until a candidate location is found. These windows can be FFT processed or time domain processed to identify one or more candidate locations, or to just identify that this entire window is the candidate subset.

If desired, a sub-block (or set of sub-blocks) may span more than one period. An advantageous method of doing this is to, rather than have uniform samples, to have clumps of samples covering the same locations in multiple periods. This reduces the amount of memory and processing used at one time, but allows multiple frames to be considered at once.

The correlation calculation is advantageously an accurate approximation to the analog correlation function. However, this operation can be simplified, approximated, or adapted in the particular implementation. For example, only the most significant bit of the I and Q sample could be considered. A fully filtered SYNC pattern could be used in the multiplication, or merely the SYNC symbol bits. In the latter case, the multiplication function can be replaced by a binary selection function for I and Q. It is important that the operation is tolerant to carrier phase rotations when these can be present, and it is desirable to obtain a good confidence in the probability of detection.

Thus, on signals with reasonable signal to noise ratios, one can hunt for the SYNC with FFT windows until a candidate location is found. This candidate location is then confirmed by subsequent processing, for example by doing one or more further FFTs of samples covering the same location in later period(s), and processing the results. Alternatively, the location can be confirmed by trying to equalize with the assumption of that candidate location and measuring the mean squared error that results from the attempt. Often there may be other parameters such as laser offset frequency that may not yet be known and will need to also have assumed candidate values for this confirmation step.

It is generally desirable to frame or reframe within one to three milliseconds. This requires the appropriate hardware to be able to do the required processing quickly. Slower methods, involving greater amounts of firmware or software processing, could be used in order to reduce the amount of hardware required.

These methods can also be applied to keep confirming that one is still in frame long after the successful candidate has been identified and confirmed. High speed digital optical communications systems have symbol rates greater than one GigaHertz, such as ten GigaHertz. This generally requires that the time between successive samples is less than one nanosecond, such as 100 ps or 50 ps.

The embodiments of the invention described above are intended to be illustrative only. The scope of the invention is therefore intended to be limited solely by the scope of the appended claims.

I claim:

1. A method of estimating a location of a periodic SYNC burst within an optical signal received by a receiver through an optical communications system, the method comprising steps of:

a processor of the receiver calculating a cross-correlation between a multi-bit digital signal corresponding to the received optical signal and a known pattern corresponding to the SYNC burst;

a framer processing samples of the cross-correlation to identify a candidate sub-block within which the SYNC burst is most likely located, wherein the candidate sub-block comprises a respective plurality of samples of the cross-correlation spanning more samples of the cross-correlation than the SYNC burst and less than a SYNC burst period; and the framer further processing samples of the cross-correlation within the candidate sub-block to identify the most likely location of the SYNC burst within the candidate sub-block.

2. The method as claimed in claim 1, wherein the step of calculating the cross-correlation comprises steps of:

selecting one of a set of two or more known SYNC burst symbol sequences; and applying a respective sample pattern corresponding to the selected SYNC burst symbol sequence to the multi-bit digital signal.

3. The method as claimed in claim 2, wherein the step of selecting one of a set of two or more known SYNC burst symbol sequences comprises a step of periodically selecting a different one of the set of two or more known SYNC burst symbol sequences.

4. The method as claimed in claim 1, further comprising processing the multi-bit digital signal to compensate dispersion of the optical signal.

5. The method as claimed in claim 4, wherein processing the multi-bit digital signal to compensate dispersion of the optical signal is performed before calculation of the cross-correlation.

6. The method as claimed in claim 4, wherein processing the multi-bit digital signal to compensate dispersion of the optical signal is performed simultaneously with calculation of the cross-correlation.

7. The method of claim 1, wherein the multi-bit digital signal comprises at least two parallel multi-bit sample streams, and wherein calculating the cross-correlation comprises steps of:

calculating a respective cross-correlation signal for each sample stream; and combining the respective cross-correlation signals.

8. The method of claim 7, wherein each cross-correlation signal is calculated using a respective pattern corresponding to a unique one of a set of SYNC bursts.

9. The method of claim 7, wherein at least two cross-correlation signals are calculated using the respective pattern corresponding to a common SYNC burst.

10. The method of claim 7, wherein combining the respective cross-correlation signals comprises computing a sum of squares of the respective cross-correlation signals.

11. The method as claimed in claim 1, wherein the step of identifying a candidate sub-block in which the SYNC burst is most likely located comprises steps of:

accumulating a respective tail probability for one or more sub-blocks;

detecting a first tail probability to reach a predetermined condition; and identifying the corresponding sub-block as the candidate sub-block in which the SYNC burst is most likely located.

12. The method as claimed in claim 11, wherein the tail probability is represented by a count of samples which are greater than a predetermined threshold.

13. The method as claimed in claim 12, wherein the predetermined condition is an overflow condition of a counter for counting samples which are greater than the predetermined threshold.

14. The method as claimed in claim 1, wherein the step of processing samples of the cross-correlation within the candidate sub-block comprises steps of:

for each sample of the candidate sub-block, accumulating a respective count of instances in which the corresponding sample value is greater than a predetermined threshold;

detecting a first count to reach a predetermined condition; and identifying the corresponding sample as a most likely location of the SYNC burst within the candidate sub-block.

15. The method as claimed in claim 14, wherein the predetermined condition is an overflow condition of a counter for counting samples which are greater than the predetermined threshold.

16. A receiver of an optical communications system, the receiver comprising:

a processor configured to calculate a cross-correlation between a multi-bit digital signal corresponding to a received optical signal and a known pattern corresponding to a periodic SYNC burst within the received optical signal;

a framer configured to process samples of the cross-correlation to identify a candidate sub-block within which the SYNC burst is most likely located, and to further process samples of the cross-correlation within the candidate sub-block to identify the most likely location of the SYNC burst within the candidate sub-block;

the candidate sub-block comprising a respective plurality of samples of the cross-correlation spanning more samples of the cross-correlation than the SYNC burst and less than a SYNC burst period.

17. A non-transitory computer readable storage medium storing software instructions for execution by a receiver of an optical communications system, the software instructions being configured to control the receiver to implement a method estimating a location of a periodic SYNC burst within an optical signal received by the receiver through the optical communications system, the method comprising steps of:

calculating a cross-correlation between a multi-bit digital signal corresponding to the received optical signal and a known pattern corresponding to the SYNC burst;

processing samples of the cross-correlation to identify a candidate sub-block within which the SYNC burst is most likely located, wherein the candidate sub-block comprises a respective plurality of samples of the cross-correlation spanning more samples of the cross-correlation than the SYNC burst and less than a SYNC burst period; and further processing samples of the cross-correlation within the candidate sub-block to identify the most likely location of the SYNC burst within the candidate sub-block.

18. The receiver as claimed in claim 16, wherein the processor comprises a logic block configured to apply the known pattern to the multi-bit digital signal to calculate the cross-correlation.

19. The receiver as claimed in claim 16, wherein the processor comprises:

a coefficient calculator configured to calculate a set of dispersion coefficients as a sum of a linear dispersive function and a Fast Fourier Transform of the known pattern; and a frequency-domain dispersion compensator configured to apply the calculated set of dispersion coefficients to the multi-bit digital signal so as to simultaneously compensate dispersion of the received optical signal and calculate the cross-correlation.

20. The receiver as claimed in claim 16, wherein the multi-bit digital signal comprises at least two parallel multi-bit sample streams, and wherein the processor is configured to process the parallel multi-bit sample streams to generate at least two parallel cross-correlation signals.

21. The receiver as claimed in claim 20, wherein the processor further comprises a sum-of-squares network for computing a sum of the square of each one of the parallel cross-correlation signals to generate a combined cross-correlation signal, and wherein the framer is configured to process samples of the combined cross-correlation signal to identify the candidate sub-block and to identify the most likely location of the SYNC burst within the candidate sub-block.

* * * * *